United States Patent
Halim et al.

(10) Patent No.: US 11,200,077 B2
(45) Date of Patent: Dec. 14, 2021

(54) SHELL APPLICATION

(71) Applicant: HEWLETT-PACKARD DEVELOPMENT COMPANY, L.P., Houston, TX (US)

(72) Inventors: Irwan Halim, Houston, TX (US); Christop J. Graham, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 667 days.

(21) Appl. No.: 16/081,341

(22) PCT Filed: Apr. 5, 2017

(86) PCT No.: PCT/US2017/026048
§ 371 (c)(1),
(2) Date: Aug. 30, 2018

(87) PCT Pub. No.: WO2018/186843
PCT Pub. Date: Oct. 11, 2018

(65) Prior Publication Data
US 2021/0200565 A1    Jul. 1, 2021

(51) Int. Cl.
*G06F 9/455* (2018.01)
*G06F 9/451* (2018.01)

(52) U.S. Cl.
CPC .......... *G06F 9/45512* (2013.01); *G06F 9/451* (2018.02)

(58) Field of Classification Search
CPC ...... G06F 9/445; G06F 9/44505; G06F 9/451; G06F 2203/04803; G06F 9/45512
See application file for complete search history.

(56) References Cited

U.S. PATENT DOCUMENTS

| | | | |
|---|---|---|---|
| 6,263,346 B1 | 7/2001 | Rodriquez | |
| 9,189,197 B1 | 11/2015 | Lagassey | |
| 2005/0138373 A1 | 6/2005 | Clark et al. | |
| 2005/0234139 A1* | 10/2005 | Browne | B60R 19/00 521/50 |
| 2005/0235139 A1 | 10/2005 | Hoghaug et al. | |
| 2009/0228821 A1* | 9/2009 | Tapper | G06F 9/54 715/771 |
| 2010/0269060 A1 | 10/2010 | Bandholz et al. | |
| 2012/0151403 A1 | 6/2012 | Bhogal et al. | |
| 2013/0033414 A1* | 2/2013 | Zheng | G06F 9/45512 345/1.1 |
| 2013/0283181 A1* | 10/2013 | Mazzaferri | G06F 9/542 715/740 |

(Continued)

OTHER PUBLICATIONS

Technet, "Windows 10 Kiosk Build—Embedded Shell Launcher vs Custom User Interface" (Aug. 2016), pp. 1-6 [retrieved from https://social.technet.microsoft.com/Forums/en-US/b4552957-45c2-4cc4-a13d-6397f06ee62e/windows-10-kiosk-build-embedded-shell-launcher-vs-custom-user-interface?forum=win10itprosetup].*

(Continued)

*Primary Examiner* — Brian W Wathen
(74) *Attorney, Agent, or Firm* — Brooks Cameron & Huebsch PLLC

(57) ABSTRACT

Example implementations relate to shell applications. An example controller can display, using a shell executor component and via a plurality of user interfaces running a same operating system on a same network, a plurality of shell applications. Two of the plurality of shell applications can be different shell applications.

14 Claims, 3 Drawing Sheets

---

300

- RECEIVING A REQUEST FOR A FIRST SHELL APPLICATION FROM A USER, WHEREIN THE FIRST SHELL APPLICATION IS DIFFERENT THAN A SECOND SHELL APPLICATION IN USE BY THE USER — 302
- IN RESPONSE TO THE REQUEST, DETERMINING, VIA A SHELL EXECUTOR COMPONENT, SETTINGS FOR EXECUTING THE FIRST SHELL APPLICATION — 304
- REQUESTING THE DETERMINED SETTINGS FROM A SERVICE COMPONENT — 306
- IN RESPONSE TO CONFIRMATION OF THE SETTINGS FROM THE SERVICE COMPONENT, REPLACING THE SECOND SHELL APPLICATION WITH THE FIRST SHELL APPLICATION — 308
- DISPLAYING THE FIRST SHELL APPLICATION VIA A FIRST USER INTERFACE — 310

(56) References Cited

U.S. PATENT DOCUMENTS

2014/0331147 A1\* 11/2014 Jain .................... G06F 9/44505
715/745

OTHER PUBLICATIONS

"Different Desktop for Different Users", StackExchange, Retrieved from internet—https://unix.stackexchange.com/iuestions/14994/different-desktop-for-different-users?rq=1, 2011, 2 Pages.

\* cited by examiner

SHELL APPLICATION

BACKGROUND

A shell is a user interface for access to an operating system's services. The shell is a layer around an operating system kernel. A shell can use a command-line interface and/or a graphical user interface, among other interfaces.

DETAILED DESCRIPTION

Figure 1:
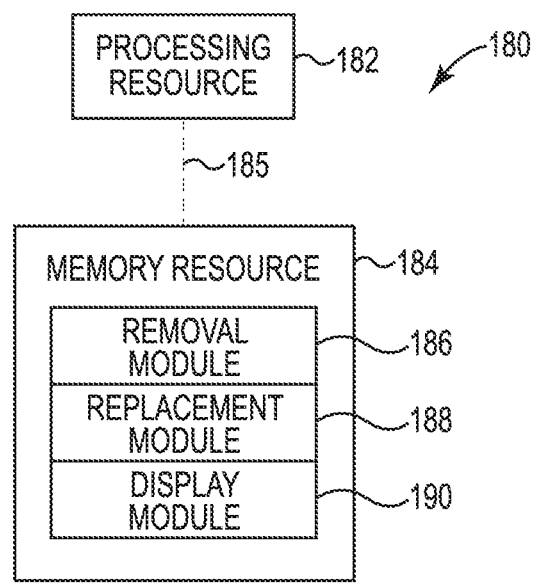
FIG. 1 illustrates a diagram of a computing system including a processing resource, a memory resource, and a number of modules according to an example.

Operating systems may have a single shell and/or desktop manager which provide users with access to objects used for running applications and managing the operating system. As used herein, "shell" is used to refer generally to an operating system shell, a desktop manager, a shell interface, a shell particular to a certain operating system (e.g., an Explorer shell), a desktop shell, and/or a desktop interface, among others. As used herein, a shell application is a single-purpose application that encompasses a shell experience. For instance, a shell application can give a user an ability to interact with other applications. Similarly, a kiosk shell application is a single purpose application that encompasses a shell experience.

The objects accessed by users can include folders and files on a computer disk drive and virtual objects that allow users to send files to remote printers, among other tasks. The shell can organize these objects and provide users and applications with a way to access and manage objects. A computer desktop associated with the shell can be customized by changing a background or icons, and this customization can be performed at an application level.

Some approaches to desktop customization include restricting an ability to tailor interfaces on a device or different devices connected to a same network and running the same operating system. For example, a shell can be executed with a "logged on" user privilege. In such an example, different users can log on, but they see the same shell, with the option of making changes to desktop backgrounds, icons, or other application level changes. A user may not have enough privilege to modify the shell settings so that it can launch another shell instead of itself. Other approaches include configuring a shell application, but do not replace a shell application; rather, the same shell application is used for all users. Examples include changing the font, font size, desktop background, colors, theme, and screen resolution, but the basic shell experience remains the same for all users. For instance, these other approaches may use a single shell application, and may modify the shell application, for instance by modifying objects on the desktop, but the shell application remains the same.

In contrast, examples of the present disclosure can remove and replace shell applications and can provide for more than one interface experience (e.g., desktop interface) based on a user who is interacting with a device. In such an example, a single application may be serving as a shell (herein after referred to as a shell application) that is focused and/or designed for a single task (e.g., a full screen application). In such an example, user A may log on to a device and see a default operating system shell. User B may log on to the device (or a different device connected to a same network and running the same operating system) and see a kiosk shell, such as an automated teller machine (ATM) shell. User C may log on to the device (or a different device connected to a same network and running the same operating system) and see a different shell application. Put another way, Users A, B, and C can each have a distinct shell application and experience a different desktop view, for instance, tailored to the user and/or a user's job function.

FIG. 1 illustrates a diagram of a computing system 180 including a processing resource 182, a memory resource 184, and a number of modules 186, 188, 190, according to an example. The computing system 180 can utilize instructions (e.g., software and/or firmware) hardware, and/or logic to perform a number of functions including those described herein. The computing system 180 can be a combination of hardware and program instructions configured to share information. The hardware, for example, can include a processing resource 182 and/or a memory resource 184 (e.g., computer readable medium (CRM), machine readable medium (MRM), etc., database, etc.).

A processing resource 182, as used herein, can include a processor capable of executing instructions stored by a memory resource 184. Processing resource 182 can be implemented in a single device or distributed across multiple devices. The program instructions (e.g., machine-readable instructions (MRI)) can include instructions stored on the memory resource 184 and executable by the processing resource 182 to implement a desired function (e.g., replacing a shell application, displaying a shell application, etc.).

The memory resource 184 can be in communication with a processing resource 182. A memory resource 184, as used herein, can include memory components capable of storing instructions that can be executed by processing resource 182. Such memory resource 184 can be a non-transitory CRM or MRM. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the computing system 180 can be implemented on a participant device, on a server device, on a collection of server devices, and/or a combination of the user device and the server device.

The memory resource 184 can be in communication with the processing resource 182 via a communication link (e.g., a path) 185. The communication link 185 can be local or remote to a machine (e.g., a computing system) associated with the processing resource 182. Examples of a local communication link 185 can include an electronic bus internal to a machine (e.g., a computing system) where the memory resource 184 is one of volatile, non-volatile, fixed, and/or removable storage medium in communication with the processing resource 182 via the electronic bus.

A module and/or modules 186, 188, 190 can include MRI that when executed by the processing resource 182 can perform a number of functions including those described herein. The number of modules 186, 188, 190 can be sub-modules of other modules. For example, the removal module 186 and the replacement module 188 can be sub-modules and/or contained within the same computing system. In another example, the number of modules 186, 188, 190 can comprise individual modules at separate and distinct locations (e.g., MRM, etc.).

Each of the number of modules 186, 188, 190 can include instructions that when executed by the processing resource 182 can function as a corresponding engine. For example, the removal module 186 can include instructions that when executed by the processing resource 182 can function as a removal engine. Similar, each of the number of modules 188, 190 can include instructions that when executed by the processing resource 182 can function as engines.

In some examples, engines can be part of a system (not illustrated in FIG. 1) including a database, a subsystem, and the number of engines. The subsystem can include the number of engines in communication with the database via a communication link (e.g., link 285 as referenced in FIG. 2). The system can represent instructions and/or hardware of a network controller (e.g., controller 230 as referenced in FIG. 2, etc.).

The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some examples, the number of modules 186, 188, 190 can be used in a software-as-a-service delivery model. For instance, components of computing system 180 can exist in a single computing system or multiple computing systems (e.g., distributed). For example, a web server or other computing system that is trusted by the user can provide services to a server of individual data streams, and/or act on behalf of the user as a processing agent for recovery.

In an example, removal module 186 can include instructions that when executed by the processing resource 182 can cause a computing system to remove a first shell application associated with a first desktop display in response to a request for a change from the first desktop display to a second desktop display. As used herein, a desktop display includes what is viewable by a user via a graphical user interface or other user interface. In some examples, a shell application may also be displayed via a user interface.

In some examples, a request may be made by a user, an administrator, a device, etc. for a particular desktop display. It may be desired for an administrator to have a particular desktop display, while a different user has a kiosk display such that the user can perform a particular task. In such an example, the user's original shell application can be replaced by a kiosk application, resulting in the user having a desktop display different than that of the administrator. The administrator's original shell application may have remained the same or may have been replaced with a different shell application. The request for the different display can include a request by a shell executor component for a new shell application. The shell executor component can run in a user session and can be tied to a logged-on user.

For instance, when an operating system is booted, a service component can be started. As used herein, a service component can be a low-level daemon that starts before an operating system starts applications in the user's working environment. Services can run in the context of the system and not a particular user. The service component can remain idle until a request is received via a shell executor component. As used herein, a service component can include a component with a super-user execution and/or system privilege that can change and/or modify settings (e.g., configurations settings) before an action can be performed. For instance, before a particular shell application can launch, particular settings are put in place to accommodate the particular shell application launch. For a different shell application (e.g., associated with a different user), different settings are put in place. The service component can change and/or modify settings without requesting permission. Changes and/or modifications may be requested by the shell executor component.

The shell executor component can be responsible for executing a shell application (and an associated user interface) based on a value it is given by the service component. For instance, the shell executor component can review a configuration mode (e.g., of configuration files associated with user applications, server processes, and or operating system settings, among others), and determine which settings can be used to replace a current shell application with a desired shell application. As used herein, replace can include redirecting an operating system's core configuration and code to launch another application instead of the operating system's shell application. If the shell executor component does not have access to the determined settings, the shell executor component can request that the service component change and/or modify settings to the determined settings.

Put another way, when a user logs on to a device, the shell executor component can be executed and can review (e.g., read) an associated configuration file to determine which shell application should be loaded. The shell executor component can validate prerequisites to launch the shell application. For instance, in some operating systems, when launching a particular shell application, if the shell application value in a registry does not match a particular process, a different shell application may launch. Because the shell executor may not have a high enough privilege to modify these settings, it can request via a communication channel that the service component change and/or modify the settings. The communication channel can include, for instance, a communication channel secured by encryption or other securing methods. The communication channel can follow a client and server model such that the shell executor component takes on the "client" role and the service component takes on the "server" role.

In response to the requests being satisfied (or not satisfied), the service component can respond to the shell executor component with a request result of success (if satisfied) or fail (if not satisfied) via the communication channel. The shell executor component can proceed by removing an original shell application and executing the new, desired shell application in response to a successful result (settings are updated/modified) or displaying an error message in response to a failing result. The communication between the service component and the shell executor component can be automatic, such that the communication can occur without little or no direct administrator control.

For instance, replacement module 188 can include instructions that when executed by the processing resource 182 can cause a computing system to replace the removed first shell application with a shell application associated with the second desktop display. For example, shell executor component can request that service component modify settings such that the first shell application is replaced by a second shell application that accommodates a desired different desktop display.

Display module 190 can include instructions that when executed by the processing resource 182 can cause a computing system to display, using a shell executor component, the second desktop display via a first user interface. For instance, the desired desktop display can be displayed, for instance, via a graphical user interface.

In some examples, removal module 186 can include instructions that when executed by the processing resource 182 can cause a computing system to remove a second shell application associated with a third desktop display in response to a request for a change from the third desktop display to a fourth desktop display, and replacement module 188 can include instructions that when executed by the processing resource 182 can cause a computing system to replace the removed second shell application with a shell application associated with the fourth desktop display. Put another way, a different user can have a shell application removed and replaced via the shell executor component and the service component. In some examples, display module 190 can include instructions that when executed by the processing resource 182 can cause a computing system to display, using a shell executor component, the fourth desktop display via a second user interface. For instance, the desired desktop display can be displayed via a graphical user interface to the different user.

In some examples, the first and the second user interfaces are communicatively coupled to a common network. For instance, the different users can have different desktop display experiences because their shell applications have been replaced. In such an example, the users may or may not have started with a same shell application and/or desktop display. The users' replaced shell applications may be tailored to the first and the second users based on requests, device use, job functions, and/or other factors.

Figure 2:
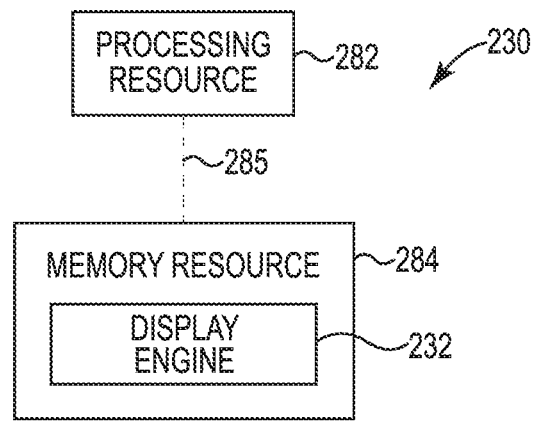
FIG. 2 illustrates a diagram of a controller including a processing resource, a memory resource, and an engine according to an example.

FIG. 2 illustrates a diagram of an example controller 230 including a processing resource 282, a memory resource 284, and an engine 232 according to an example. For example, the controller 230 can be a combination of hardware and instructions for displaying a plurality of shell applications. The hardware, for example can include a processing resource 282 and/or a memory resource 284 (e.g., MRM, CRM, data store, etc.).

The processing resource 282, as used herein, can include a number of processors capable of executing instructions stored by a memory resource 284. The instructions (e.g., MRI) can include instructions stored on the memory resource 284 and executable by the processing resource 282 to implement a desired function (e.g., replacing a shell application, displaying a shell application, etc.). The memory resource 284, as used herein, can include a number of memory components capable of storing non-transitory instructions that can be executed by processing resource 282. Memory resource 284 can be integrated in a single device or distributed across multiple devices. Further, memory resource 284 can be fully or partially integrated in the same device as processing resource 282 or it can be separate but accessible to that device and processing resource 282. Thus, it is noted that the controller 230 can be implemented on an electronic device and/or a collection of electronic devices, among other possibilities.

The memory resource 284 can be in communication with the processing resource 282 via a communication link (e.g., path) 285. The communication link 285 can be local or remote to an electronic device associated with the processing resource 282. The memory resource 284 includes an engine (e.g., display engine 232). The memory resource 284 can include more engines than illustrated to perform the various functions described herein.

The engine can include a combination of hardware and instructions to perform a number of functions described herein (e.g., replacing a shell application, displaying a shell application, etc.). The instructions (e.g., software, firmware, etc.) can be downloaded and stored in a memory resource (e.g., MRM) as well as a hard-wired program (e.g., logic), among other possibilities.

The display engine 232 can display, using a shell executor component and via a plurality of user interfaces running a same operating system on a same network, a plurality of shell applications. At least two of the plurality of shell applications can be different shell applications. In some examples, two users on a same network running a same operating system may begin with a uniform shell application (e.g., associated with the operating system), and a uniform user interface may be displayed to both users. For instance, a uniform shell may include a taskbar, start menu, tray icon, etc. However, it may be desired for the two users to have different shell applications. The different shell applications can be tailored to each user. For instance, it may be desired for a first user to have a web shell application desktop display while a second user has kiosk shell application desktop display. A web shell application may include, for instance, a website page (e.g., as in a public library, hotel, etc.). A kiosk shell application can include for instance, an ATM application or calculator application, among others. It may be desired for a third user to keep the original shell application. The three example desktop displays may be displayed on three different user interfaces. While two and three users are discussed herein, more than two or three users and/or user interfaces may be participating. In some instances, a shell application may be replaced and subsequently returned. For instance, an ATM shell application may be replaced with a maintenance shell application to perform maintenance on an ATM machine, and the maintenance shell application can be replaced by the ATM shell application when maintenance is complete.

To display the plurality of shell applications, modified settings can be requested from a service component for launching each of the plurality of shell applications. For instance, a shell executor component can determine what settings are needed to run each shell application for each user, and the service component having greater execution and system privileges than the shell executor component can change and/or modify settings accordingly. The plurality of shell applications can launch the modified settings, and the launching can be performed via the shell executor component and in response to receiving the modified settings.

In some examples, at least one of the two of the plurality of shell applications replaced a removed shell application in response to a request for a change from the removed shell application to the at least one of the two of the plurality of shell applications. For instance, the uniform shell application can be removed and replaced by the web shell application for the first user. Similarly, the uniform shell application can be removed and replaced by the kiosk shell application for the second user.

In some examples, the plurality of shell applications can be displayed in response to a request received via the shell executor component from a user of the network for a particular desktop display associated with one of the plurality of shell applications. For instance, when a user logs on to a network, the user may see a uniform desktop display (e.g., a uniform shell application). However, the user, for instance an administrator, may request a different desktop display. When the user logs on, the shell executor component can be executed and in response to a request, the shell executor component can request appropriate settings from the service component since the shell executor component may not have great enough system and execution privileges to provide the requested shell application.

In some instances, a plurality of different shell applications can be displayed via a user interface of a device based on a user who has logged into the device. For instance, a first user can log into a network on a device, and the shell executor component can request from the service component the appropriate settings associated with a shell application associated with the first user's login credentials. A second user can log into the network on the device, and the shell executor component can request from the service component the appropriate settings associated with a shell application associated with the second user's login credentials. This can apply to a plurality of users and can happen automatically. Additionally or alternatively, a first user can log on to the network on different devices and have the same shell application display no matter the device. Similar, a second user can log on to the network on different devices and have the same shell application display no matter the device. Each shell application can be tailored to each user, such that the shell application associated with the logins are appropriate for the user. For instance, an administrator may have a shell application displaying a desktop display of icons, start menus, and a plurality of other objects. A second user may have a kiosk shell application displaying a single function. For example, the second user may be logging into an ATM machine using a personal identification number, and the single function may be retrieving money, whereas the administrator may be able to adjust settings or view a balance remaining in an ATM machine via the administrator's shell application.

Figure 3:
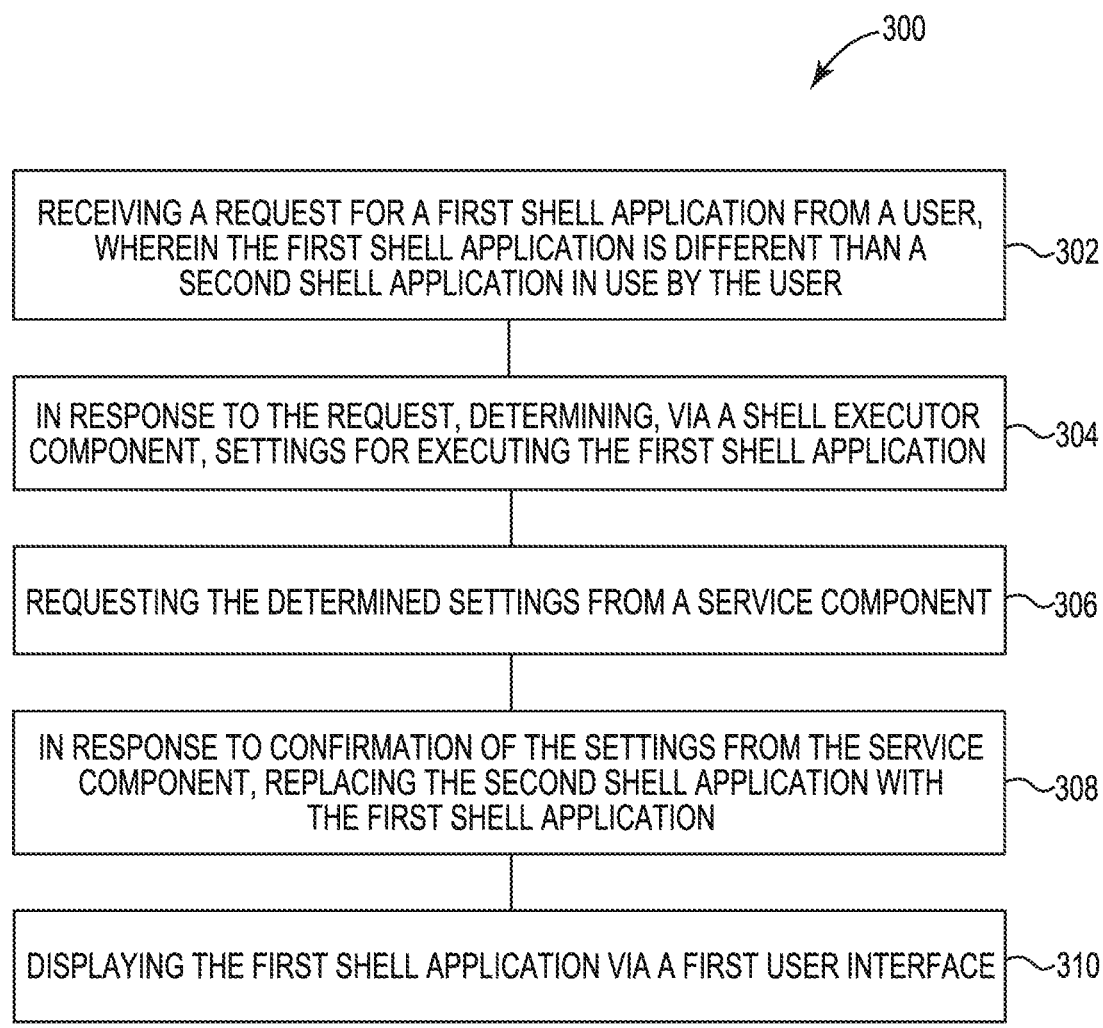
FIG. 3 illustrates a diagram of a method for displaying a shell application according to an example.

FIG. 3 illustrates a diagram of a method 300 for displaying a shell application according to an example. At 302, method 300 can include receiving a request for a first shell application from a user, wherein the first shell application is different than a second shell application in use by the user. For instance, a user may log on to a network and a uniform shell application may be displayed. The user may request a different shell application. For example the user may desire a web shell application that is tailored to the user's job function. In some examples, an administrator or other user may request the change for the user.

At 304, method 300 can include determining, in response to the request and via a shell executor component, settings for executing the first shell application. The shell executor component can determine a configuration mode and/or other settings that accommodate the new first shell application. For instance, a web shell application may have different or modified settings and/or may use a different configuration mode as the second shell application in use by the user.

Method 300, at 306, can include requesting the determined setting from a service component. For instance, because the shell executor component may not have great enough execution and/or system privileges to change and/or modify the settings to accommodate the new shell application, a request is made to the service component. In some examples, the shell executor component can request via a secure communication channel that the service component modify and/or change the settings.

At 308, method 300 can include replacing the second shell application with the first shell application in response to confirmation of the settings from the service component. The first shell application can be executed via the shell executor component, and at 310, method 300 can include displaying the first shell application via a first user interface. In some examples, method 300 can include displaying a third shell application simultaneous to displaying the first shell application and via a second user interface on a same network as the first user interface. The third shell application can be different than the first shell application. For instance, two different users logged on to two different devices (each having its own user interface) on the same network can view tailored shell applications.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A controller comprising a processing resource in communication with a memory resource including instructions executable to:
 display, using a shell executor component and via a plurality of user interfaces running a same operating system on a same network, a plurality of shell applications,
  wherein two of the plurality of shell applications are different shell applications; and
 request modified settings from a service component for launching each of the plurality of shell applications.

2. The controller of claim 1, wherein at least one of the two of the plurality of shell applications replaced a removed shell application in response to a request for a change from the removed shell application to the at least one of the two of the plurality of shell applications.

3. The controller of claim 1, wherein the instructions to display the plurality of shell applications include instructions executable to launch, via the shell executor component and in response to receiving the modified settings, the plurality of shell applications using the modified settings.

4. The controller of claim 1, wherein the instructions are executable to display the plurality of shell applications in response to a request received via the shell executor component from a user of the network for a particular desktop display associated with one of the plurality of shell applications.

5. The controller of claim 1, wherein:
 a first one of the two of the plurality of shell applications is tailored to a first user; and
 a second one of the two of the plurality of shell applications is tailored to a second user.

6. A non-transitory machine-readable medium storing instructions executable by a processing resource to cause a computing system to:
 remove a first shell application associated with a first desktop display in response to a request for a change from the first desktop display to a second desktop display;

replace the removed first shell application with a shell application associated with the second desktop display; and display, using a shell executor component, the second desktop display via a first user interface.

7. The medium of claim 6, further comprising instructions executable to:

remove a second shell application associated with a third desktop display in response to a request for a change from the third desktop display to a fourth desktop display;

replace the removed second shell application with a shell application associated with the fourth desktop display; and display, using the shell executor component, the fourth desktop display via a second user interface.

8. The medium of claim 7, wherein the first and the second user interfaces are communicatively coupled to a common network.

9. The medium of claim 6, wherein the service component has greater execution and system privileges than the shell executor component.

10. The medium of claim 6, wherein the service component is in communication with the shell executor component via a secure communication channel.

11. A method, comprising:

receiving a request for a first shell application from a user, wherein the first shell application is different than a second shell application in use by the user;

in response to the request, determining, via a shell executor component, settings for executing the first shell application;

requesting the determined settings from a service component;

in response to confirmation of the settings from the service component, replacing the second shell application with the first shell application; and displaying the first shell application via a first user interface.

12. The method of claim 11, wherein requesting the determined settings includes requesting that the service component modify the settings via a secure communication channel.

13. The method of claim 11, further comprising executing the first shell application via the shell executor component.

14. The method of claim 11, further comprising displaying a third shell application simultaneous to displaying the first shell application and via a second user interface on a same network as the first user interface, wherein the third shell application is different than the first shell application.

* * * * *